United States Patent
Craske (10) Patent No.: US 10,552,156 B2
(45) Date of Patent: Feb. 4, 2020

(54) PROCESSING OPERATION ISSUE CONTROL

(71) Applicant: ARM Limited, Cambridge (GB)

(72) Inventor: Simon John Craske, Cambridge (GB)

(73) Assignee: ARM Limited, Cambridge (GB)

( * ) Notice: Subject to any disclaimer, the term of this patent is extended or adjusted under 35 U.S.C. 154(b) by 120 days.

(21) Appl. No.: 15/497,461

(22) Filed: Apr. 26, 2017

(65) Prior Publication Data

US 2018/0314527 A1    Nov. 1, 2018

(51) Int. Cl.
G06F 9/38    (2018.01)
G06F 9/30    (2018.01)

(52) U.S. Cl.
CPC .......... *G06F 9/3836* (2013.01); *G06F 9/3005* (2013.01); *G06F 9/3016* (2013.01); *G06F 9/30072* (2013.01)

(58) Field of Classification Search
CPC .. G06F 9/3836; G06F 9/3005; G06F 9/30072; G06F 9/3016; G06F 9/3826; G06F 9/38; G06F 9/30007; G06F 9/30003; G06F 9/00; G06F 9/262; G06F 9/264
See application file for complete search history.

(56) References Cited

U.S. PATENT DOCUMENTS

| | | | | | |
|---|---|---|---|---|---|
| 4,298,933 | A | * | 11/1981 | Shimokawa | G05B 19/05 712/226 |
| 5,958,043 | A | * | 9/1999 | Motomura | G06F 9/3838 712/216 |
| 2010/0306504 | A1 | * | 12/2010 | McDonald | G06F 9/3001 712/208 |
| 2015/0089191 | A1 | * | 3/2015 | Gonion | G06F 9/30036 712/7 |
| 2016/0026486 | A1 | * | 1/2016 | Abdallah | G06F 9/3818 703/26 |

* cited by examiner

*Primary Examiner* — Michael J Metzger
(74) *Attorney, Agent, or Firm* — Nixon & Vanderhye P.C.

(57) ABSTRACT

Processing circuitry for performing data processing operations includes issue control circuitry to control issue of the processing operations. Validity marking circuitry marks when input operands are valid and available within an issue queue, and is responsive to a first input operand of the plurality of input operands having a predetermined value to mark a second input operand of the plurality of input operands as meeting its validity condition (i.e. it is possible to determine from the first input operand that the result of the processing operation concerned will be independent of the value of the second input operand and accordingly there is no need to wait for it to actually be available). In order to resolve ordering constraint problems which may be associated with the use of the early valid marking technique separate ordering valid flags may be provided and monitored in respect of at least order-constrained processing operations.

14 Claims, 5 Drawing Sheets

⋯▷ = slow path
\# = chain of ordering
  dependence enforces
  STR after LDR

PROCESSING OPERATION ISSUE CONTROL

BACKGROUND

Technical Field

This disclosure relates to the field of data processing systems. More particularly, this disclosure relates to the control of the issue of processing operations to processing circuitry within data processing systems.

Technical Background

It is known to provide data processing circuitry with issue control mechanisms that control the issue of data processing operations to processing circuitry to be performed when the input operands and other prerequisites for the processing operation are available. Such issue control mechanisms can be employed within both in-order and out-of-order processors as a way of increasing processing throughput.

SUMMARY

At least some aspects of the present disclosure provide apparatus for processing data comprising:

processing circuitry to perform a processing operation having a plurality of input operands;

issue control circuitry to control issue of said processing operation to said processing circuitry for processing when said plurality of input operands meet respective validity conditions; and validity marking circuitry to mark respective ones of said plurality of input operands as meeting their validity conditions; wherein said validity marking circuitry is responsive to a first input operand of said plurality of input operands having a predetermined value to mark a second input operand of said plurality of input operands as meeting its validity condition.

At least some aspects of the present disclosure provide apparatus for processing data comprising:

processing means for performing a processing operation having a plurality of input operands;

issue control means for controlling issue of said processing operation to said processing means for processing when said plurality of input operands meet respective validity conditions; and validity marking means for marking respective ones of said plurality of input operands as meeting their validity conditions; wherein said validity marking means is responsive to a first input operand of said plurality of input operands having a predetermined value to mark a second input operand of said plurality of input operands as meeting its validity condition.

At least some aspects of the present disclosure provide a method of processing data comprising the steps of:

controlling issue of a processing operation having a plurality of input operands to processing circuitry to be processed when said plurality of input operands meet respective validity conditions; and in response to a first input operand of said plurality of input operands having a predetermined value marking a second input operand of said plurality of input operands as meeting its validity condition.

Further aspects, features and advantages of the present technique will be apparent from the following description of examples, which is to be read in conjunction with the accompanying drawings.

DESCRIPTION OF EXAMPLES

Figure 1:
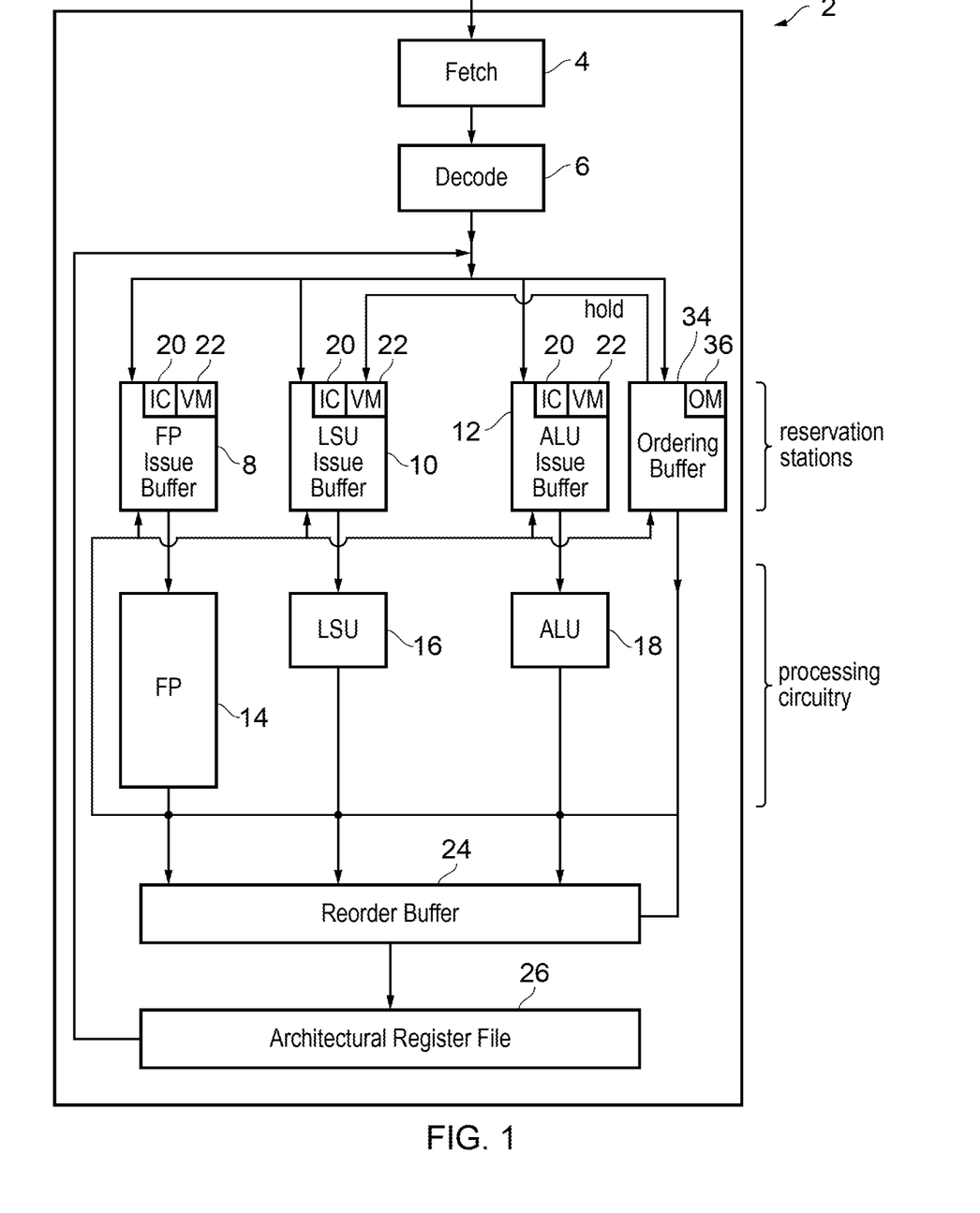
FIG. 1 schematically illustrates a data processing apparatus incorporating issue control mechanisms.

FIG. 1 schematically illustrates a data processing system 2 in which program instructions I are fetched by fetch circuitry 4 from a memory (not shown). The fetched instructions are decoded by decoding circuitry 6 to identify the processing operations they specify, the input operands required and the destination operands to be written as well as other characteristics of the program instructions. In this example embodiment separate processing pipelines are provided for handling floating point FP instructions, load/store instructions and arithmetic/logical instructions. Each of these pipelines has a respective issue buffer 8, 10, 12 into which data characterising the data processing operation to be performed in response to the programming instruction decoded is written. These issue buffers 8, 10, 12 may also be referred to as reservation stations.

The data characterising the processing operation which is awaiting issue within one of the issue buffers 8, 10, 12 specifies a variety of information, such as the value of input operands to be required, whether the input operands required have been validly written into the issue buffer entry (i.e. a validity flag for an input operand), data identifying the opcode of the program instruction which was decoded (and accordingly the processing operation to be performed), information identifying the destination register or registers into which result data is to be written as well as other information characterising the data processing to be performed as will be familiar to those in this technical field.

One constraining factor controlling when a processing operation can be issued to a respective one of the floating point processing circuitry 14, the load store unit 16, or the arithmetic logic unit 18 is when all of the required input operand values for that processing operation have been collected and are available within the issue buffer 8, 10, 12 entry for that processing operation. Issue control circuitry 20 associated with each of the issue buffers 8, 10, 12 of the respective processing pipelines serves to control issue of the processing operations from the issue buffer concerned 8, 10, 12 into the processing circuitry 14, 16, 18 associated with the relevant issue buffer when all of the required input operands for the processing operation concerned meet their validity conditions. Conventionally, meeting all the validity conditions indicates that the input operands concerned have all been stored into the issue buffer entry for the processing operation and accordingly are ready to send to the appropriate one of the processing circuitry pipelines 14, 16, 18.

Validity marking circuitry 22 associated with each of the issue buffers 8, 10, 12 serves to monitor the storage (capture) into the issue buffer entries of the required input operands as these are read from the output of the processing pipelines in respect of previous processing instructions as part of being written to a re-order buffer 24 which forms part of this example out-of-order data processing apparatus example shown in FIG. 1. When a particular input operand is stored into the issue buffer entry for a processing operation, the validity marking circuitry 22 marks that input operand as valid. When all the required input operands of an issue buffer entry are marked as valid, and any other prerequisites for performing the processing operation are met, the issue control circuitry 20 issues the processing operation to the respective processing circuitry 14, 16, 18 within an available processing slot.

The present technique recognizes that in the case of certain processing operations the value of one of the input operands may be such that the result of that processing operation will not be dependent upon one or more other of the input operands. In this case, those other input operands for which it has been identified that there is no output result dependency can be marked as valid even though the operand values for those other input operands have not yet been stored into the issue buffer entry concerned. The validity marking circuitry 22 can thus be responsive to a first input operand of a plurality of input operands having a predetermined value to mark a second (other) input operand of the plurality of input operands as meeting its validity condition even though that second (other) input operand has not yet been stored in the issue buffer entry concerned. Early marking of such an input operand as meeting its validity condition when it is known that the result of the processing operation will not depend upon that input operand has the result of potentially increasing processing operation throughput by enabling earlier issue.

Output operands from the processing circuitry 14, 16, 18 are written to a re-order buffer 24 as part of conventional out-of-order processing control techniques. When an output operand value written to the reorder buffer 24 is committed as non-speculative then it is written into an architectural register file 26. Input operand values to be supplied to the issue buffers 8, 10, 12 are read, for an out-of-order processor, from the reorder buffer 24 for speculative values, or from the architectural register file 26 for committed values already present in the architectural register file 26 at the time the instruction was placed in one of the issue buffers 8, 10, 12.

The action of the validity marking circuitry 22 to identify situations in which a combination of a particular processing operation and a particular first input operand value mean that it is possible to mark a second input operand value (or possibly multiple other input operand values) as valid can take a variety of different forms. The following are particular example forms where this technique can be used, but these example forms are not limiting to the scope of the present technique.

Figure 2:
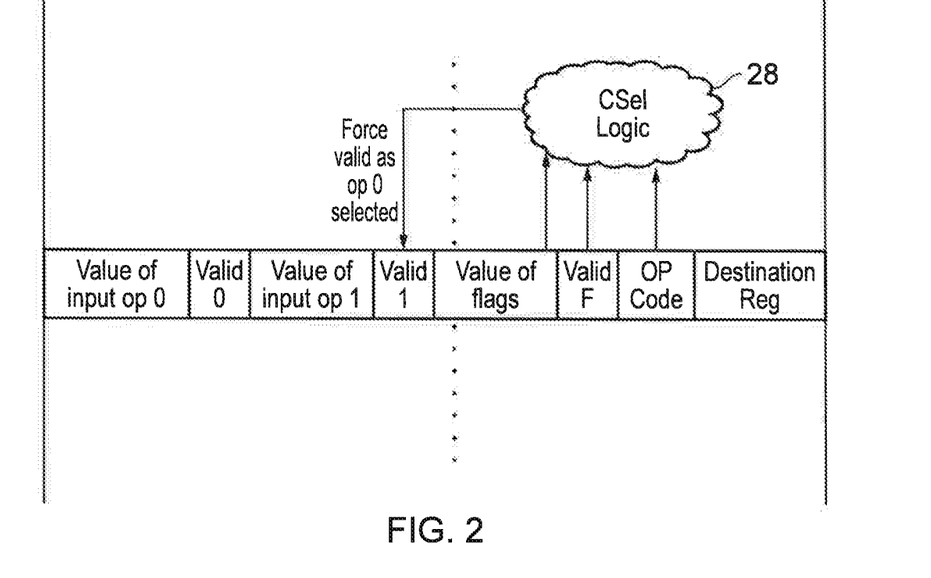
FIG. 2 schematically illustrates validity marking circuitry targeted at conditional select instructions.

In the case of a conditional select processing operation which selects between a third input operand and a second input operand in dependence upon a value of a first input operand, when the value of the first input operand becomes known, and this indicates that the third input operand will be selected, then it is possible to mark the second input operand as valid even though it is not yet present within the issue buffer concerned as it is known that the second input operand will not be selected and accordingly the output of the arithmetic logic unit 18 performing the conditional select processing operation will not depend upon the second input operand value. The validity marking circuitry 22 within the arithmetic logic unit 12 includes, as illustrated in FIG. 2, CSel logic 28 which is responsive to a valid value of the flag input operand to the conditional select instruction which indicates that input operand 0 will be selected to force the marking as valid of the input operand 1 even though this has not yet been received into the issue buffer 12. The CSel logic 28 could also operate in the reverse sense as responsive to a valid flag value indicating that input operand 1 will be selected to force the marking as valid of input operand 0 even though input operand 0 has not yet been received.

FIG. 2 schematically illustrates an entry within the issue buffer 12 of the arithmetic logic pipeline (12, 18) responsible for processing a conditional select instruction. This issue buffer entry includes, for example, the value of the first input operand 0, the validity flag of the first input operand, the value of a second input operand, the validity flag of the second input operand, the value of a flag operand input (derived from previous processing), the validity flag for the flag operand input, the opcode of the conditional select instruction and a destination register into which the selected result is to be written. It will be appreciated that in practice, the issue buffer entry may include additional or alternative data characterising the processing operation to be performed as represented by that issue buffer entry.

Figure 3:
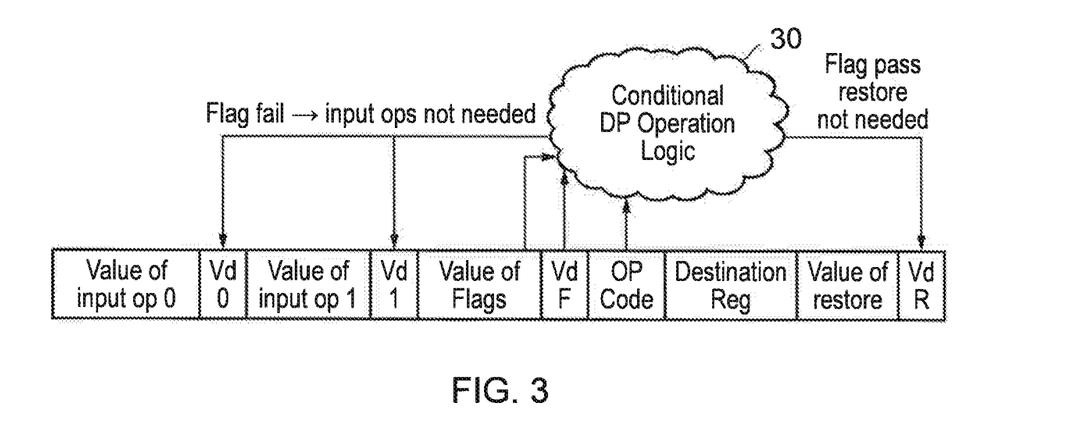
FIG. 3 schematically illustrates validity marking circuitry targeted at conditional data processing instructions.

FIG. 3 schematically illustrates another example form of a processing operation for which validity marking circuitry 22 may serve to early mark as valid input operands which are identified as not being needed to generate the proper output/result from that data processing operation. In this case, the data processing operation is a conditional data processing operation. Conditional DP operation logic 30 which forms part of the validity marking circuitry 22 within the arithmetic logic pipeline (12, 18) serves to monitor the input operand flag value and the validity flag of the input operand flag value to identify when the flags which will control whether or not that conditional data processing operation will be executed have been received into the issue buffer. When the controlling condition code flags from preceding operations have been received into the issue buffer entry, the conditional DP operation logic 30 determines whether or not these indicate that the conditional DP operation fails its condition codes and will not be executed. In this case, the validity flags for the input operands may be forced to be valid even though the corresponding input operand values have not yet been received into the input buffer as the result of the conditional data processing operation will not dependent upon these input operand values. Thus, the conditional data processing operation failing its condition codes can be issued (removed) from the issue buffer more rapidly as the need to wait for receipt of input operand values of which the result is independent is removed. In the converse case where the flag values indicate that the conditional data processing operation passes its condition code constraint, the conditional DP operation logic 30 can force the valid flag associated with a restore value of that conditional data processing operation to be forced valid as it is known that the conditional data processing operation does pass its condition test and accordingly the restore value will not be needed.

Figure 4:
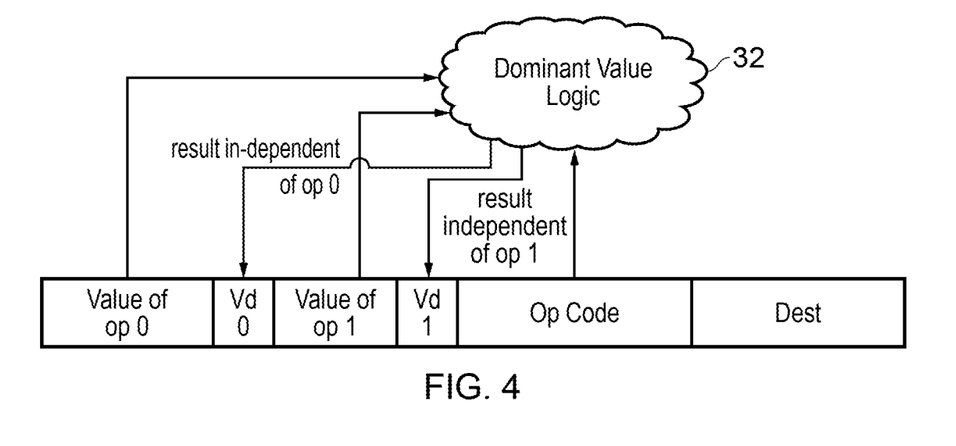
FIG. 4 schematically illustrates validity marking circuitry targeted at arithmetic or logical operations having a dominant input operand.

FIG. 4 schematically illustrates another example in which issue from the issue buffer 12 may be performed earlier in response to identifying that one of the input operands of an arithmetic processing operation or a logical processing operation has a dominant value such that the result of that arithmetic processing operation or logical processing operation will be independent of one or more other of the input operand values. In this case, dominant value logic 32 which forms part of the validity marking circuitry 22 within the issue buffer 12 of the arithmetic logic pipeline (12, 18) is responsive to values of the input operands which have been validly received together with the opcode value of the processing operation concerned to determine when such a dominant value condition arises.

Examples of such dominant value conditions include, for example, a multiplication instruction where one of the input operands is 0. In this case, if the dominant value logic 32 identifies that a received input operand of a multiplication instruction is 0, then it can be determined that the result of the multiplication will be 0 and is independent of the other input operand value, which accordingly can be forced to be marked as valid even though it has not yet been received. Another example of such a dominant value processing operation which can be identified is a logical shift of a sufficient length that the result value will be 0 as all bits of any significance will have been shifted out. A further example is a logical OR of two input operands when one of the input operands consists of all binary 1 values and accordingly the result will also be all 1. A further example would be a logical AND operation in which one of the input operands was all 0 values in which case the output operand will be all 0 values. A further example is an instruction seeking to identify the larger of two input operands when it is known that one of the input operands is all 1 values and accordingly is the maximum possible value as the result will also be this maximum possible value.

The above examples discussed in relation to FIGS. 2, 3 and 4 are only some examples of combinations of particular processing operations and particular input operand values which can be used to identify that that result of the processing operation will be independent of another of the input operand values and accordingly permit/triggers early marking of that other input operand as valid thereby increasing potential processing speed.

A problem which may arise in some example embodiments using the above technique concerns memory model compliance with load data to load/store address dependency requirements that may be violated by use of the above techniques. In particular, the early marking of input operands as valid even though those input operands have not actually been generated at that time (as a result of knowing that the result of a particular processing operation will be independent of that not yet generated input operand) has the result of moving forward in the execution timeline of the processing operation which has had its input operand marked as valid using the above described techniques. In the case of a sequence of program instructions which includes a load of data (e.g. an LDR instruction in the ARM instruction set), then a subsequent load/store instruction to a calculated address which may have a dependency upon the loaded data value directly or indirectly (such load data to load/store-address dependency can be particularly important in multi-processor systems where different processors should observe a consistently ordered view of the data within the memory). As a particular example consider execution of the following ARM processing instructions:

Executing the following code:
LDR vD,[vA] ; vD→mem[vA] ;load from slow memory.
CSEL vE,vD,VB ; vE→cond?vD:vB ;selects vB based on early flags.
DIV vF,vC,vE ; vF→vC/vE ;slow data-processing operation.
LDR vG,[vE] ; vG→mem[vE] ;data→address dependent load.

Using the value dependency elimination as described previously, could provide two results:
1. The execution of the CSEL and DIV could complete without the data from the first LDR being ready (assuming "cond" is favourable).
2. The second LDR is able to execute before the first LDR returns data.

While result (1) provides a valuable performance uplift, result (2) is in breach of most contemporary memory ordering requirements (based on the vE→vD→LDR dependency chain).

In order to address this issue of maintaining load/data to load/store address dependency when using the previously described techniques for the early valid marking of input operands, the example embodiments of FIG. 1 includes an ordering buffer 34 which stores ordering data associated with processing operations within the issue buffers 8, 10, 12 of the processing pipelines such that the ordering constraints associated with any order-constrained processing operations (such as loads and stores) can be monitored/tracked and enforced. Order marking circuitry 36 within the ordering buffer 34 serves to mark respective ones of the plurality of input operands associated with a processing operation being held within another of the issue buffers 8, 10, 12 as meeting their ordering conditions whereby an input operand of the plurality of input operands corresponding to an output of a proceeding processing operation in the ordered sequence of program instructions being executed is marked as not meeting its ordering condition until output of the preceding processing operation is actually generated. In this example embodiment, as a processing operation is decoded and an entry stored into one of the issue buffers 8, 10, 12, a corresponding entry (which may be considered as a dependency micro-operation) is generated and has a corresponding entry stored within the ordering buffer 34. In the case of processing operations which are ordering-constrained processing operations, (such as load and store operations in this example embodiment), the ordering buffer 34 issues a hold signal to the corresponding issue buffer 10 in respect of such order-constrained processing instructions to prevent such ordering-constrained processing instructions being issued (e.g. into the load store unit 16) until both their ordering conditions and their validity conditions are met. The ordering of operands from other processing operations which are not order-constrained processing operations may be tracked within the ordering buffer 34, but such processing operations which are not order-constrained processing operations can be allowed to issue once their validity conditions are met even though their ordering conditions may not be met at that time. One particular example of an order-constrained processing operation is a memory access operation (either a load or a store) to a memory address specified as an input operand to the memory access operation. Such a memory address specified as an input operand may be dependent upon earlier data processing, and accordingly an earlier data load which has not been completed, and so the ordering condition ensuring that the earlier data load has been completed is monitored and enforced. The present technique thus provides separate validity condition flags and ordering condition flags which can be separately set and monitored. In this example embodiment, when a processing operation is not order-constrained, then only the validity flags need be considered (including use of the potential speed up technique discussed above) in controlling the issue of such processing operations. In the case of order-constrained processing operations then both the validity condition flags and the order condition flags are considered before the processing operation is issued.

Figure 5:
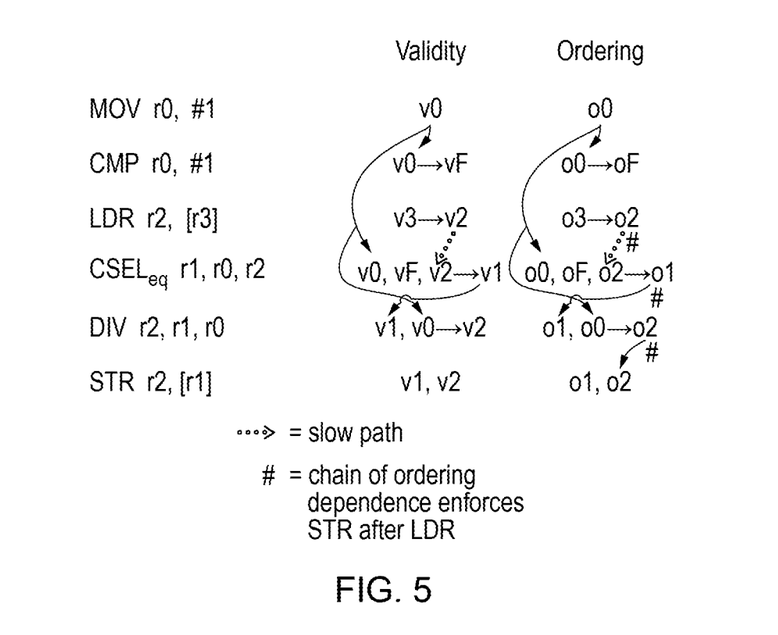
FIG. 5 schematically illustrates a sequence of program instructions with their associated validity markings and ordering markings together with some of the dependencies between the validity and ordering conditions represented by the markings.

FIG. 5 schematically illustrates a sequence of ARM processing instructions together with the associated validity condition flags and ordering condition flags which are monitored in the respective issue buffers 8, 10, 12 and the ordering buffer 34. This particular sequence of instructions includes a move instruction which loads register r0 with a value of 1, a compare instruction, a load to a register specified address instruction, a conditional select instruction, a divide instruction and a store instruction to a register specified address. Validity condition flags such as v0 indicating the validity of the input operand corresponding to the register value r0 are stored within the issue buffers 8, 10, 12. A validity flag of indicates the validity of the condition code flags for the preceding instructions.

In a similar way, the ordering condition flags which are stored within the ordering buffer 34 are indicated by flag values such as o0 indicating the ordering of register r0 in the ordered sequence of processing operations corresponding to the program flow shown in FIG. 5. In the example of FIG. 5 the MOV instruction generates a value which is written into register r0 and accordingly an ordering valid flag associated with this register is generated and written into the ordering buffer 34 as o0. The compare instruction CMP consumes the register value r0 and generates result flags. Accordingly, there is an ordering dependency between the MOV instruction and the CMP instruction and the ordering marker flag associated with the flags generated by the CMP instruction is dependent upon the ordering marking flag o0 indicating that the register value r0 has been written into the register r0 before the CMP operation is performed. The ordering flag of associated with the flag values is generated in association with the CMP instruction and is linked to the ordering flag o0 associated with the MOV instruction.

It will be seen in FIG. 5 that the generation of the validity flag for the register value r2 associated with the LDR instruction will be relatively slow in arriving due to the long latency associated with an LDR instruction compared to non memory accessing instructions. The dependency chain associated with the register r2, which is the destination register for the store instruction STR as the final instruction in the sequence, is illustrated in FIG. 5 by the a # symbol. This ordering dependency is monitored by the order marking circuitry 36 within the ordering buffer 34 and indicated to the issue control circuitry 20 within the issue buffer 10 so as to delay issue of the store instruction STR until the memory value has been returned to the register r2 in response to the LDR instruction. This enforces load data to load/store address dependency ordering in respect of the order constrained STR instruction.

In FIG. 5 the entries in the validity and ordering columns indicate on their left side the required validity flags indicating validity for the inputs to the respective instructions and after the arrow the output validity flags from those instructions, or in the case of the ordering flags the input ordering flags and the output ordering flags respectively.

Figure 6:
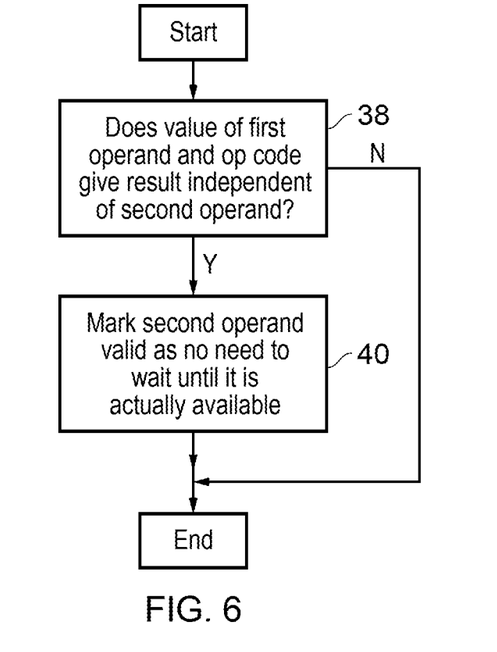
FIG. 6 is a flow diagram schematically illustrating the action of validity marking circuitry.

FIG. 6 is a flow diagram schematically illustrating the early setting of a validity flag by validity marking circuitry. At step 38 the validity marking circuitry determines whether the value of a first operand which has been received and the opcode of the data processing operation concerned indicate that the result of that data processing operation will be independent of a second operand. When such a condition is met, then step 40 serves to mark the second operand as valid as there is no need to wait until it is actually available as the result will be independent of that second operand.

Figure 7:
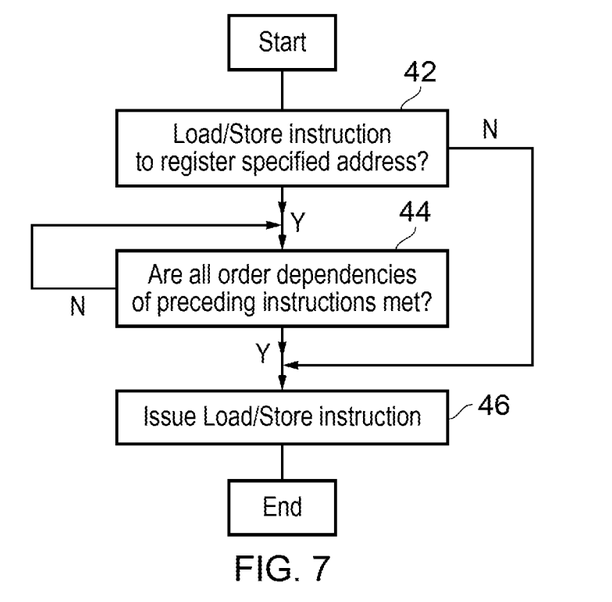
FIG. 7 is a flow diagram schematically illustrates the action of issue control circuitry responsive to ordering markings.

FIG. 7 is a flow diagram schematically illustrating ordering enforcement in respect of an ordering/constrained data processing operation in the form of a load/store instruction to a register specified address. Step 42 determines whether a load/store instruction to a register specified address has been received and is ready for issue within the issue buffer 10 of the load/store unit. If such an order-constrained processing operation is present, then processing proceeds to step 44 where the ordering flags within the ordering buffer 34 are monitored until they indicate that all order dependencies of preceding instructions within the program flow have been met and accordingly the load/store instruction is ready to issue. When such dependencies are all met, then step 46 serves to issue the load/store instruction.

Figure 8:
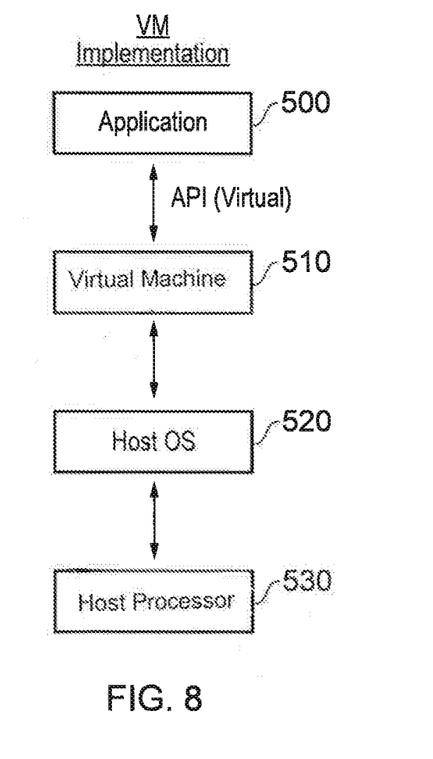
FIG. 8 schematically illustrates an example embodiment using a virtual machine.

FIG. 8 schematically illustrates a virtual machine implementation that may be used. Whilst the earlier described embodiments implement the present disclosure in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 may be stored on a computer-readable storage medium (which may be a non-transitory medium), and provides an application program interface (instruction execution environment) to an application program 500 which is the same as the application program interface which would be provided by the real hardware which is the device being modelled by the virtual machine program 510. Thus, the program instructions may be executed from within the application program 500 using the virtual machine program 510 to model their interaction with the virtual machine hardware, with the validity marking operations described above triggered by the virtual machine program 510.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data comprising:
processing circuitry to perform a processing operation having a plurality of input operands;
an issue buffer to store data characterizing said processing operation awaiting issue to said processing circuitry;
issue control circuitry to control issue of said processing operation from said issue buffer to said processing circuitry for processing when said plurality of input operands meet respective validity conditions; and
validity marking circuitry to mark respective ones of said plurality of input operands as meeting their validity conditions; wherein
said validity marking circuitry is responsive to a first input operand of said plurality of input operands having a predetermined value to mark a second input operand of said plurality of input operands as meeting its validity condition;
and at least one of:
said processing operation is a conditional select processing operation to select between a third input operand and said second input operand in dependence upon a value of said first input operand, and said validity marking circuitry is responsive to said first input operand having a value indicating that said third input operand is selected to mark said second input operand as valid; or
said processing operation is a conditional data processing operation to select between an output corresponding to a data processing operation performed upon one or more computational input operands and an output corresponding to a restorative input operand, said validity marking circuitry is responsive to said first input operand having a value indicating said conditional data processing operation is performed to mark said restorative input operand as valid, and said validity marking circuitry is responsive to said first input operand having a value indicating said conditional data processing operation is not performed to mark said one or more computational input operands as valid.

2. Apparatus as claimed in claim 1, wherein said first input operand having said predetermined value corresponds to said processing operation having a result that is independent of said second input operand.

3. Apparatus as claimed in claim 1, wherein
in response to an arithmetic processing operation with a dominant value of said first input operand rendering a result of said arithmetic processing operation independent of a value of said second operand, said validity marking circuitry is responsive to said first input operand having said dominant value to mark said second input operand as valid.

4. Apparatus as claimed in claim 1, wherein
in response to a logical processing operation with a dominant value of said first input operand rendering a result of said logical processing operation independent of a value of said second operand, said validity marking circuitry is responsive to said first input operand having said dominant value to mark said second input operand as valid.

5. Apparatus as claimed in claim 1, wherein
said processing operation is one of an ordered sequence of processing operations and comprising
order marking circuitry to mark respective ones of said plurality of input operands as meeting their ordering conditions whereby an input operand of said plurality of input operands corresponding to an output of a preceding processing operation in said ordered sequence is marked as not meeting its ordering condition until said output of said preceding processing operation is generated.

6. Apparatus as claimed in claim 5, wherein said sequence of processing operations comprises at least some order-constrained processing operations and said issue control circuitry delays issuing an order-constrained processing operation until ordering conditions of input operands of said order-constrained processing operation are met.

7. Apparatus as claimed in claim 6, wherein said order-constrained processing operation comprises a memory access operation to a memory address specified as an input operand to said memory access operation.

8. Apparatus as claimed in claim 5, wherein said validity marking circuitry is responsive to said first input operand of said plurality of input operands having said predetermined value to mark said second input operand of said plurality of input operands as meeting its validity condition independent of whether said second input operand corresponds to said output of said preceding processing marked as not meeting its ordering condition.

9. Apparatus as claimed in claim 1, wherein the issue buffer is further configured to store values of said plurality of input operands and validity flags for said plurality of input operands to indicate whether said input operands meet their respective validity conditions.

10. Apparatus as claimed in claim 9, wherein said validity marking circuitry is responsive to said data characterizing said processing operation and at least a value of said first input operand to control said marking of said second input operand of said plurality of input operands as meeting its validity condition.

11. Apparatus for processing data comprising:
processing circuitry to perform a processing operation having a plurality of input operands;
an issue buffer to store data characterizing said processing operation awaiting issue to said processing circuitry;
issue control circuitry to control issue of said processing operation from said issue buffer to said processing circuitry for processing when said plurality of input operands meet respective validity conditions; and
validity marking circuitry to mark respective ones of said plurality of input operands as meeting their validity conditions; wherein
said validity marking circuitry is responsive to a first input operand of said plurality of input operands having a predetermined value to mark a second input operand of said plurality of input operands as meeting its validity condition;
said processing operation is one of an ordered sequence of processing operations, and
the apparatus comprises:
an ordering buffer to store data characterizing ordering conditions associated with said ordered sequence of processing operations; and
order marking circuitry to mark respective ones of said plurality of input operands as meeting their ordering conditions whereby an input operand of said plurality of input operands corresponding to an output of a preceding processing operation in said ordered sequence is marked as not meeting its ordering condition until said output of said preceding processing operation is generated.

12. Apparatus for processing data comprising:

processing circuitry to perform a processing operation having a plurality of input operands;

an issue buffer to store data characterizing said processing operation awaiting issue to said processing circuitry;

issue control circuitry to control issue of said processing operation from said issue buffer to said processing circuitry for processing when said plurality of input operands meet respective validity conditions; and validity marking circuitry to mark respective ones of said plurality of input operands as meeting their validity conditions; wherein said validity marking circuitry is responsive to a first input operand of said plurality of input operands having a predetermined value to mark a second input operand of said plurality of input operands as meeting its validity condition;

wherein the issue buffer is further configured to store values of said plurality of input operands and validity flags for said plurality of input operands to indicate whether said input operands meet their respective validity conditions; and the apparatus comprises:

an ordering buffer to store data characterizing ordering conditions associated with said ordered sequence of processing operations; and decoder circuitry to decode a program instruction corresponding to said processing operation and to generate an issue queue entry in said issue queue corresponding to said processing operation and an ordering buffer entry in said ordering buffer corresponding to said processing operation.

13. A method of processing data comprising the steps of:

controlling issue of a processing operation having a plurality of input operands from an issue buffer for storing data characterizing said processing operation to processing circuitry to be processed when said plurality of input operands meet respective validity conditions; and in response to a first input operand of said plurality of input operands having a predetermined value marking a second input operand of said plurality of input operands as meeting its validity condition;

wherein said processing operation is one of an ordered sequence of processing operations, and the method comprises:

storing data characterizing ordering conditions associated with said ordered sequence of processing operations in an ordering buffer; and marking respective ones of said plurality of input operands as meeting their ordering conditions whereby an input operand of said plurality of input operands corresponding to an output of a preceding processing operation in said ordered sequence is marked as not meeting its ordering condition until said output of said preceding processing operation is generated.

14. A virtual machine providing an instruction execution environment to operate in accordance with a method as claimed in claim 13.

* * * * *